United States Patent Office 2,992,978
Patented July 18, 1961

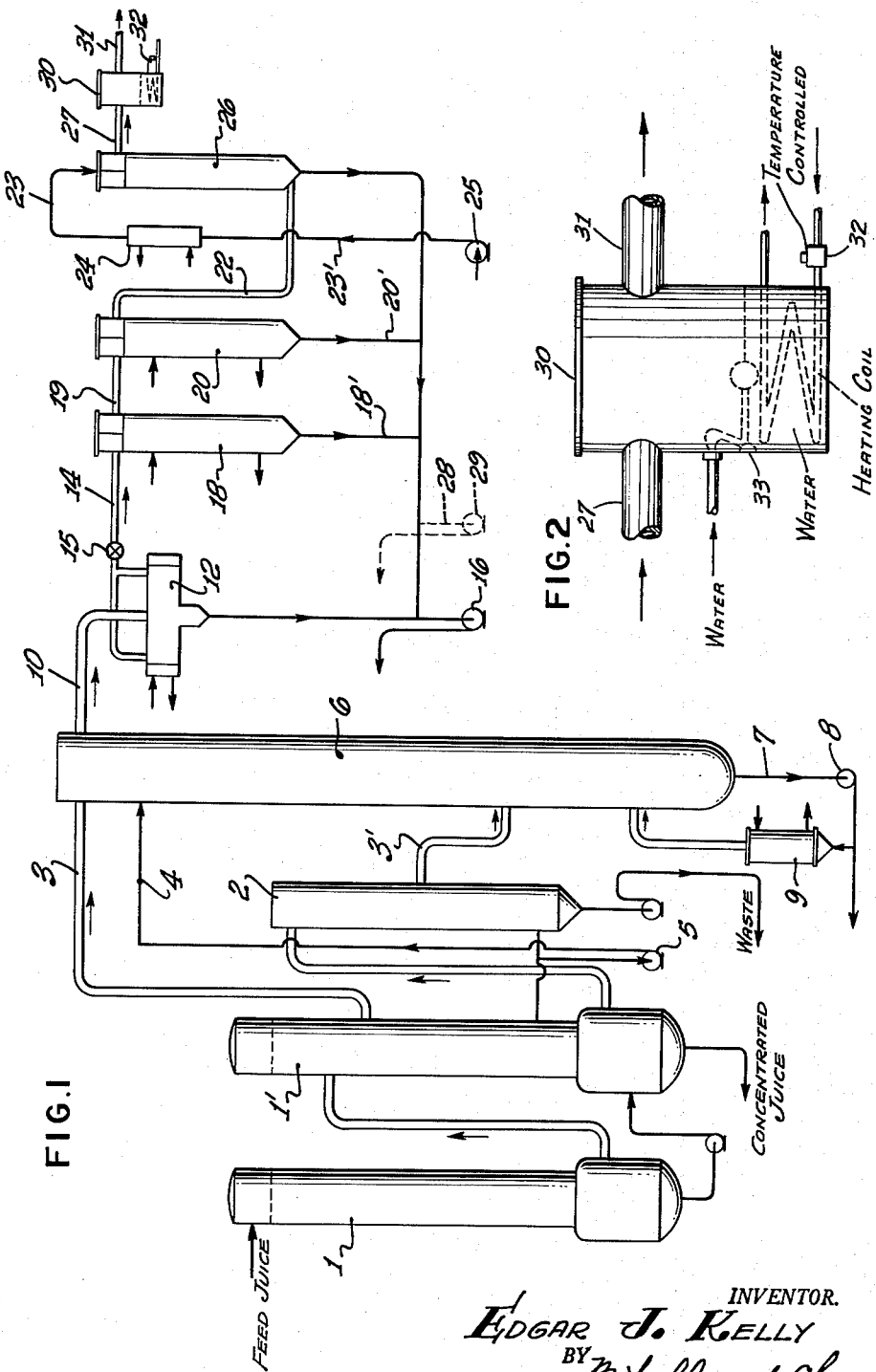

2,992,978
APPARATUS FOR PRODUCING FLAVOR CONSTITUENTS
Edgar J. Kelly, 16351 Yorba Linda Blvd., Placentia, Calif.
Filed Oct. 13, 1958, Ser. No. 766,902
5 Claims. (Cl. 202—160)

The present invention is directed to a method of separating the characteristic odor and flavor constituents from aqueous source materials generally derived from fruit, berries, beverage materials, such as tea and coffee, etc. The invention is also directed to specific conditions and arrangements of elements for the production of a new concentrate or distillate containing the flavor and aroma constituents in very large proportion or high concentration.

For many years it has been recognized that fresh fruit and vegetable juice contained flavoring and aromatic constituents which are extremely characteristic of the particular fruit, plant extract or the like. It has also been recognized that the natural, fresh flavor and aroma of fruit, berries, tea, coffee and other foods are deleteriously affected by the normal concentrating, heating and sterilizing steps, with cooked and off flavors and with a loss of the aroma and flavor which characterizes fresh, mature fruit. Some attempts have been made in the past to recover the relatively volatile flavors and components found in plant products for the purpose of reintroducing them into the final concentrate or canned, cooked or sterilized fruit in order to impart thereto the flavor and aroma of the fresh, natural fruit.

Prior attempts to obtain a fraction in which it was hoped that the flavoring and aromatic constituents would be present in concentrated quantity were not successful and were fallacious in their method of operation. Prior workers in this art appeared to be confused and looked for an oily material as a source of the flavor. The present invention obtains the flavoring and aromatic constituents in a non-oily, water-soluble and miscible form which is virtually colorless, transparent, mobile, burns with a clear blue flame and has a remarkably low freezing point, well below 100° C. and as low as −180° C.

One of the reasons for the failures of the prior art was the fact that the prior workers did not realize the importance of maintaining conditions of temperature and pressure below 65° C. and 190 mm. of Hg when dealing with fruit juices, citrus juices and other source materials. It has been found that the conditions of operation should be such as to prevent or minimize hydrolysis of the esters and ethers of acetic acid into acids, alcohols and secondary reaction products. It has also been discovered that the esters and ethers of acetic acid constitute important components which impart the characteristic fresh, natural flavor and aroma elements to the concentrate and to the products in which it is subsequently used; colorimetric determination of the ethyl ester of acetic acid (ethyl acetate) content of a concentrate provides a ready mode of evaluation.

Although some prior patentees have referred to what they termed a "100 fold essence" which they allegedly obtained, such term had no true meaning other than the volume of the condensate taken out of the system was 1/100 of the juice fed into the system. For example, Patent No. 2,457,315 speaks of pumping 50 g.p.h. of apple juice into a single stage evaporator, evaporating 10% of such juice, passing the vapors into a fractionating column and condensing the vapors from such column, all at atmospheric pressure. Uncondensed gases were vented from the condenser and the condensate was drawn off at 1/100 of the rate at which fresh juice was fed into the evaporator, this condensate being termed a "100 fold essence." It is evident that in such process the condenser would be fed with vapors composed essentially of water and therefore the condensate would also consist essentially of water since the water will be condensed first. The mole fraction or concentration of the flavor constituents in vapors sent to such prior condenser is far below 0.5% and the vapors would exhibit all of the properties of water vapor. The partial pressure of the volatile constituents at no time approach saturation pressures. At no time would the prior patentees eliminate the water and then condense the more volatile constituents under conditions which effectively utilized partial pressure phenomena and Dalton's law. Dew point conditions (with respect to the flavoring and aromatic constituents) were never reached; the mixtures of air, gases and vapors sent to the condenser contained excessive amounts of water vapor. As a result, the so-called "100 fold essence" was simply a mathematical and volumetric determination and did not actually contain any appreciably increased quantity of flavoring components.

The fallacy of the prior method of identifying the "essence" becomes apparent when one considers that orange juice appears to contain only about 30 p.p.m. of true essence, so that only about 1.5 to 1.6 lbs. of water-free essence can be obtained from 52,000 lbs. of citrus juice. The products made by the method of this invention actually contain one thousand times as much flavoring constituents as the original source material or juice, even in the unpurified, aqueous solution form in which they are normally obtained. Moreover, it is to be remembered that ethyl acetate has a vapor pressure of 760 mm. absolute at about 77° C., whereas water at the same temperature has a vapor pressure of 7 lbs. gauge.

Contrary to prior suggestions that the concentrated or flavor-stripped juice be used as an absorbent or scrubber for the non-condensed gases or vapors prior to venting such residual gases (in an attempt to recover some of the flavoring components from said gases), it has been found that such flavor-stripped juices are not good absorbents; instead, pure water (or dilute, aqueous solutions of ethyl alcohol or sucrose) have been found much more effective.

Generally stated, therefore, the present invention departs from the prior art and relates to a method of obtaining flavoring constituents from aqueous source materials (such as juices of fresh, natural, deciduous and citrus fruits, berries, aqueous extracts of tea leaves, roasted and ground coffee, etc.) by conducting all of the operations under temperature and pressure conditions which will not cause hydrolysis of esters of acetic acid, the temperatures not exceeding 65° C. and preferably being below 43° C. and absolute pressures not over 190 mm. of Hg and preferably as low as 30 mm. Hg. Any such source material in the form of water vapor and non-condensable gases containing minute quantities of volatile odor and flavor constituents is subjected to a temperature below about 43° C. and an absolute pressure of not over 115 mm. Hg in a condensation zone to condense not less than 70%, and preferably 80% by weight of water contained in said source material. After the water has been separated from the residual vapors and gases, such vapors and gases are subjected to dew point conditions for flavor and odor constituents and are readily condensed in accordance with Dalton's law. These flavor and odor constituents are obtained in the form of aqueous solutions having the characteristics described hereinbefore containing in excess of 40 grams per liter of such constituents. Ordinarily, the final product contains 30,000 to 60,000 p.p.m. of the volatile flavor- and aroma-imparting constituents, this being a readily handled and utilized product which is not as unstable as the pure essence; more concentrated forms have to be handled at very low temperatures because of their volatile character.

It is an object of the present invention, therefore, to disclose and provide means, methods and conditions whereby concentrated distillates or products containing flavor- and aroma-imparting constituents may be derived from various aqueous media.

A further object is to disclose and provide a novel concentrated product containing flavor- and aroma-imparting constituents at a concentration in excess of about 30,000 p.p.m. for use in various foods and food products.

Those skilled in the art will readily appreciate various other objects and advantages derived by the use of the modes of operation and conditions hereinafter disclosed in greater detail in connection with the description of an exemplary arrangement of apparatus in which the process may be carried out in the treatment of citrus juices. The appended diagrammatic representation of an arrangement of equipment is directed to the recovery of an essense composed largely of odor and flavor constituents of the character described hereinbefore.

In the exemplary form of apparatus shown in the appended diagram, FIG. 1, fresh citrus juice may be introduced into the first of a pair of multiple effect evaporators 1 and 1' and a concentrated juice (from which 15% to about 20% of original water has been removed) is discharged from the second evaporator. Water vapors from the second evaporator may be sent by line 2' to condenser 2 and its condensate is normally sent to waste. Non-condensable gases from 1 are sent to 1'; non-condensable gases from 1' and condenser 2 are sent by lines 3 and 3' to a fractionating column 6. Since the condensate from 1' contains some flavor and aroma constituents (this may also be true to a lesser degree as to condensate from 2), the condensate is pumped as by pump 5 and fed by line 4 to column 6. Those skilled in the art will understand that suitable supply of heat, valves, temperature and pressure indicating devices etc. are used and need not be shown in the diagram.

It is highly desirable that the multiple effect evaporators be operated at as low temperature as possible, preferably below 65° C., although somewhat higher temperatures may be employed. It is to be understood that the arrangement of evaporators or other equipment from which the non-condensable gases and extracts or solutions are obtained are not an essential part of this invention; these preliminary units and operations will vary in accordance with the material being treated; if, for example, a coffee essence is to be obtained, no evaporators would be used, but instead, leaching tanks would be employed for the purpose of obtaining an aqueous extract of coffee, such extract being made at a low temperature of below about 65° C. and preferably at a temperature of below about 43° C.

The equipment illustrated in the diagram and adapted to carry out the process herein disclosed comprises, in addition to the fractionating column 6, a primary overhead type of condenser indicated at 12, a series of saturation component condensers indicated at 18 and 20, a scrubber indicated at 26 and a constant pressure chamber indicated at 30. It is to be understood that additional saturation component condensers may be employed, the diagram being limited to the two, 18 and 20, only for purposes of simplification. The entire system from the fractionating column 6 to the constant pressure chamber 30 is maintained under a substantially uniform vacuum. Uniform and constant vacuum conditions below about 115 mm. Hg are preferably maintained throughout the system; it has been found desirable to maintain pressures as low as 30 mm. Hg in the saturation component condensers 18 and 20 and the scrubber 26. The desired vacuum conditions are attained by connecting the outlet line 31 extending from the constant pressure chamber 30 to a suitable source of vacuum, such as a barometric condenser, suitable pumps, ejectors or the like.

The fractionating column 6 is maintained with a bottom temperature of not over about 55° C., although temperatures as high as 65° C. may be used in some instances. Temperatures at the top of the fractionating column should not exceed 43° C. and are preferably maintained on the order of about 32° C.–33° C. A part of the bottoms discharged from the bottom of the fractionating column 6 as by line 7 and sent to the pump 8 may be recirculated through a reboiler 9 and returned to the fractionating column, as indicated. These bottoms may be discharged by the pump 8 to waste or other disposal.

The vapors from the fractionating column 6 are discharged by line 10 to the condenser 12. The temperature and pressure conditions within the condenser 12 are such as to condense not less than about 70% by weight of water contained in the vapors submitted to such condenser through the line 10. As previously indicated, the virtually constant subatmospheric pressure is maintained throughout the system and such pressure should be below about 155 mm. Hg. In actual practice, pressures of approximately 50 mm. Hg to as low as 30 mm. Hg are employed; under such pressure conditions the temperature within the condenser 12 is maintained at between about 30° C. and 43° C. in order to thoroughly strip the gases of at least 70% of their moisture content.

The condensed water is discharged from the overhead condenser 12 as by line 13 and the uncondensable components, residual vapors and gases, are discharged as by lines 14 and 14' into the first of a series of saturation component condensers such as the condenser 18. A valve 15 is indicated in the line 14 and although normally kept open, may be used to slightly throttle the gases and assure condensation of the required amount of water in the condenser 12.

The condenser 18 is operated at a temperature of, say around 16° C.–18° C., and gases which have not been condensed in the condenser 18 are discharged by line 19 into the condenser 20, which in the example being given, would now operate at a still lower temperature, say, a temperature of approximately 10° C. The odor and flavor constituents which have been condensed in condensers 18 and 20 are discharged therefrom by lines 18' and 20', respectively, into a manifold line 21, permitting these odor and flavor constituents to be combined. The uncondensed vapors and gases from condenser 20 are then shown being sent by line 22 to the scrubber 26. This scrubber also operates at the very low pressure of 30 mm. to 50 mm. of Hg and spray of scrubbing liquid supplied thereto by line 23 is preferably chilled as by a chiller 24 before introduced into the scrubber. As previously indicated, it is desirable to use clean, pure water as a scrubbing liquid and such water may be supplied to the chiller 24 by means of pump 25 and line 23'. The liquid from the scrubber 26, containing its absorbed and adsorbed odor and flavor constituents, is discharged into the line 21. The still uncondensed and uncondensable vapors or gases from the scrubber are now discharged as by line 27 into the constant pressure chamber 30. FIG. 2 represents an enlargement of constant pressure chamber 30 and shows more details of its construction. This device insures constancy of vacuum throughout the system and contains a body of water in its lower portion, together with a temperature control device indicated at 32 which actuates a valve (or switch) so as to admit either steam or electric current into a heating coil located in such body of water in the event the temperature of the body of water drops below a predetermined point. A float control is also provided (indicated at 33) for the purpose of maintaining a constant level of water in the device. As previously indicated, the outlet pipe 31 leading from the constant pressure chamber is associated with a suitable source of vacuum.

The condensates discharged from condensers 18 and 20 and the scrubber 26 will contain the greatest concentrations of the odor and flavor constituents. For example, when the system is operated on orange juice, the concentrations obtained will range from between about 10,000 p.p.m. to 150,000 p.p.m. The condensate from the primary condenser 12 will also contain some odor and flavor constituents but at a low concentration, say, only 100 to 200 p.p.m. Although the condensates and concentrates from the condensers 18 and 20 and scrubber 26 may be combined in a line 21 and separately withdrawn as indicated by line 28 through a pump 29 and sent to essence tanks, bottling, or the like, it has been found desirable to combine these concentrates with the condensate from the primary condenser 12 because of the relatively large amount of the condensate obtained from condenser 12 in comparison with the relatively small quantities (having high concentration of odor and flavor components) obtained from the condensers 18, 20, etc. The appended diagram therefore shows line 21 in communication with outlet line 13, all of the concentrates being sent through a pump 16 and then by line 17 to storage.

The following data may be of interest in indicating the results obtained on orange juice where the fractionating tower 6 was fed with vapors and concentrate containing approximately 30 p.p.m. of the odor and flavor constituents and the entire system was maintained at a subatmospheric pressure of 45 mm. Hg. The concentrate from the condenser 12, maintained at a temperature of 38° C. contained about 100 p.p.m. of the essence and amounted to two gallons per minute; the condensate from condenser 18 (maintained at a temperature of 16° C.) contained 20,000 p.p.m. of the essence but the discharge amounted to only 0.1 g.p.m.; the condensate from condenser 20 (maintained at a temperature of 10° C.) contained 100,000 p.p.m. of essence discharged at the rate of 0.1 g.p.m.; the scrubber 26, maintained at a temperature of only 2° C., accounted for 0.5 g.p.m. containing aobut 10,000 p.p.m. of essence.

As previously indicated, the temperature and pressure conditions within the entire system and throughout the process are such as to prevent or minimize hydrolysis of the esters and ethers of acetic acid into acids, alcohols and secondary reaction products. A determination of the ethyl acetate content of the concentrate or condensates is the simplest and most effective method of determining the actual presence of the odor and flavor constituents and in evaluating such concentrates and essence. For purposes of the record, the following reagents and methods are employed in making the ethyl acetate determinations:

*Reagents employed (percent designations are weight/volume)*

(1) Hydroxylamine hydrochloride, 13.9% (2 M).
(2) NaOH, 3.5 N.
(3) HCl, 4 N.
(4) $FeCl_3.6H_2O$, 10% in 0.1 N HCl.
(5) Ethyl acetate standards; 25, 50, 100, 150 and 300 p.p.m. in distilled water. Weight 1.000 g. of pure ethyl acetate in a sealed container, transfer to 1 liter volumetric flask and dilute with water. Dilute this 1000 p.p.m. solution to prepare standards. Due to the high volatility of ethyl acetate, the transfers and dilutions must be done with a minimum exposure to evaporation.

*Determination*

Transfer 200 ml. of juice to an 800 ml. Kjeldahl flask, add 5 drops of mineral oil, a few glass beads and distill 50 ml. into 40 ml. of water in a 125 ml. Erlenmeyer flask. The distillate is delivered below the surface of the receiving water by means of a glass tube constricted to a 2–3 mm. orifice. The receiving water is kept chilled by means of an ice water bath to minimize escape of the esters. Dilute the distillate to 100 ml.

Pipette 2 ml. of hydroxylamine reagent into a 50 ml. Erlenmyer flask and add 5.0 ml. of the ester sample (standard solutions or distillates) followed immediately with 2 ml. of the sodium hydroxide reagent. The hydroxylamine may be added to all flasks of a given assay at one time but the sodium hydroxide must be added as soon as possible after each ester sample. Mix and allow to stand for five minutes and then add 2 ml. of the hydrochloric acid reagent and mix. The individual flasks may be held at this point until all samples and standards of a given assay are also at this stage. Add 2 ml. of the ferric chloride reagent, mix, pour 5 ml. into a Klett tube, and read immediately, using filter 54 in a Klett photoelectric colorimeter which has been set at zero using a blank of 5 ml. of water plus 2 ml. of each of the four reagents.

Rinse Klett tube with a few ml. of colored sample before filling with the next sample. Use the same tube for all color readings. If matched tubes are available, the color may be developed directly in the tube using one-half as much of sample and reagents. Mix with a flat-tipped glass rod.

Calculate esters as ethyl acetate by comparison with the standards.

The above reagents and method of determination are particularly well adapted for the determination of the odor and flavor constituents in relatively dilute or low concentrations. The content of ethyl acetate in the essence or concentrates is normally obtained by diluting the concentrates to a desirable point, say, within a range of colorimetric determination against samples having a standard of 1000 or 5000 p.p.m.

The essence obtained from the juice of citrus fruits, crushed berries and grapes, purees of deciduous fruits (such as apricots, apples, pears, peaches, etc.) can be used to impart a natural, fresh and characteristic flavor and aroma to food products and confections, ice cream, etc. or reincorporated into the concentrated source material. Orange essence obtained by this process can be added to concentrated orange juice and convert the usual flat, cooked taste of reconstituted beverages made from such concentrates into beverages which cannot be distinguished from natural fresh juice. Citrus essences obtained by the methods herein disclosed are free from the terpene-like odors and flavors which characterize citrus oils. One of the important characteristics of the essences recovered by this process is stability upon storage; this may be due, in part at least, to the fact that hydrolysis and decomposition are minimized at the low temperature and pressure conditions, and to the fact that all of the constituents (including naturally contained stabilizing agents) are present in their usual, natural proportions.

Emphasis is again placed upon the necessity of maintaining low, uniform subatmospheric pressures throughout the system composed of the fractionating tower and condensers and the conjoint use of progressively lower temperatures at such uniform subatmospheric pressure in order to obtain an essence containing the exceptionally high content of odor- and flavor-imparting constituents in a form unaltered from that assumed by the constituents in the fresh, natural source material. For best results the maximum temperature of vapors should be below about 55° C. at a pressure of not above 115 mm. Hg absolute. Piping between condensers, scrubbers and fractionating tower should be sufficiently large to avoid any material variation in pressure in the system. The constant pressure device 30 performs the important function of preventing the pressure in the condensers from dropping. For example, when the temperature of the vapors in the top of fractionating column 6 is to be maintained at 38° C., the body of water in 30 is also maintained at 38° C. by control device 32 and the water vapor generated at 30 prevents the barometric condenser, ejector, purge or vacuum pump from dropping the pressure in 12, 18, 20 and 26 below the desired pressure of, say, 50 mm. Hg. It is to be noted that 1 lb. of air can carry about 10 lbs. of water vapor at 38° C. and 50 mm. Hg, but will carry about 24 lbs. of water vapor at the same temperature if the pressure drops to 48 mm. Hg; 1 lb. of air can carry about 4 lbs. of water vapor at 38° C. and 56 mm. Hg. These figures show the necessity of maintaining a uniform pressure, condensing and removing the major proportion of water from the gases and then decreasing the temperature to obtain the benefit of the change in partial pressures and reach the dew point of the flavor and odor constituents. Although 1 lb. of air will carry 10 lbs. of water vapor at 50 mm. Hg and a temperature of 38° C., only 0.2 lb. of water vapor can be carried by 1 lb. of air at 50 mm. Hg and a temperature of 16° C.; at 10° C. and the same pressure, the water vapor capacity of air is down to about 0.14 lb. Applicant therefore utilizes a mode of operation which distinguishes from all prior methods, and is able to obtain condensed essence containing in excess of 30,000 p.p.m. of the desired constituents in commercial installations.

The essence of coffee, tea, cacao beans, and other condiments and food products can be obtained by leaching the ground source materials with water at a temperature below about 30 C.–35° C. and then supplying such aqueous infusions to the fractionating tower and its associated system of condensers under the conditions hereinbefore described. Even in the case of coffee, the resulting essence is a colorless, clear, water-miscible, mobile and volatile liquid of extremely low freezing point; a room is filled with the aromatic and stimulating fragrance of freshly percolating coffee when the stopper is removed from a small bottle of such essence. Alkaloids are absent and such coffee essence may be used in making flavorful coffee by addition to any inocuous, suitably colored aqueous solution.

The equipment employed in the performance of the methods herein disclosed can vary greatly from that schematically illustrated. Attention is called to the fact that each of the condensers and chillers is provided with suitable heat exchange devices supplied with cold water, brine or refrigerant under automatic temperature-responsive controls. Those skilled in the art can readily construct the equipment in the light of this invention for any given volume of vapors and non-condensable gases per hour, and evaluate the resulting essence concentrates by the test method herein disclosed.

I claim:

1. In a system for the recovery of volatile flavor and odor constituents in concentrated form from aqueous media containing said constituents, said system including aa fractionating column, a plurality of condensers connected in series with the vapor outlet of said column and a single source of vacuum connected to the last of said condensers, the provision of: means for maintaining said series of condensers under substantially uniform subatmospheric pressure comprising a constant pressure device including a housing having an upper portion in communication with gases from the last of said condensers and in communication with the source of vacuum, and a lower portion containing a body of water exposed to gases in said upper portion, and temperature-responsive means for imparting heat to said body of water to maintain the temperature thereof at the temperature of vapors entering the first of said series of condensers.

2. A system as stated in claim 1, wherein the condensers intermediate said first condenser and said constant pressure device are maintained at progressively lower temperatures than the temperature at which said body of water is maintained.

3. A system as stated in claim 1 including float control means associated with said housing for maintaining a constant level of water therein.

4. In a system for the recovery of volatile flavor and odor constituents in concentrated form from aqueous media containing said constituents, said system including a fractionating column, a plurality of condensers connected in series with the vapor outlet of said column and a single source of vacuum connected to the last of said condensers, the provision of: means for maintaining the first of said condensers at a predetermined temperature of below 43° C. and means for maintaining the other condensers of said series at progressively lower temperatures than said first condenser; means for maintaining substantially the same subatmospheric pressure of not over about 155 mm. of Hg in said series of condensers comprising a constant pressure device including a housing having an upper portion in communication with gases from the last of said condensers and in communication with the source of vacuum, and a lower portion containing a body of water exposed to the gases in said upper portion, and means for controllably supplying heat to said body of water to maintain said body at the predetermined temperature of vapors entering the first of said series of condensers, whereby water vapor is controllably supplied from said body of water to the gases traveling to the source of vacuum.

5. In a system for the recovery of volatile flavor and odor constituents in concentrated form from aqueous media containing said constituents, said system including a fractionating column, a plurality of condensers connected in series with the vapor outlet of said column and a single source of vacuum connected to the last of said condensers, the provision of: means for maintaining said series of condensers under substantially uniform subatmospheric pressure comprising a constant pressure device including a housing having an upper portion in communication with gases from the last of said condensers and in communication with the source of vacuum and a lower portion containing a body of water exposed to the gases in said upper portion, and means for controllably supplying heat to said body of water to maintain said body at the predetermined temperature of vapors entering the first of said series of condensers, whereby water vapor is controllably supplied from said body of water to the gases traveling to the source of vacuum.

References Cited in the file of this patent

UNITED STATES PATENTS

| | | |
|---|---|---|
| 1,540,035 | Roesch | June 2, 1925 |
| 2,152,155 | Rude | Mar. 28, 1939 |
| 2,406,375 | Hoyte | Aug. 27, 1946 |
| 2,641,550 | Dykstra | June 9, 1953 |
| 2,680,687 | Lemmonier | June 8, 1954 |
| 2,680,708 | Cook | June 8, 1954 |
| 2,856,944 | Morrison | Oct. 21, 1958 |

OTHER REFERENCES

"Instruments and Process Control," published by N.Y. State Vocational and Practical Arts Association, 1945, pages 155–185, pages 158 and 159 relied upon.